(12) United States Patent
Dubovitsky

(10) Patent No.: US 6,788,420 B1
(45) Date of Patent: Sep. 7, 2004

(54) HETERODYNE INTERFEROMETER WITH A PHASE MODULATED SOURCE

(75) Inventor: Serge Dubovitsky, Los Angeles, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 101 days.

(21) Appl. No.: 10/061,067

(22) Filed: Jan. 29, 2002

(51) Int. Cl.[7] .................................................. G01B 9/02
(52) U.S. Cl. ...................................... 356/487; 356/493
(58) Field of Search ................................ 356/484, 486, 356/487, 491, 492, 493

(56) References Cited

U.S. PATENT DOCUMENTS

| | | | |
|---|---|---|---|
| 4,633,715 A | 1/1987 | Monchalin | |
| 4,834,111 A | 5/1989 | Khanna et al. | |
| 4,865,450 A | 9/1989 | Munechika et al. | |
| 4,912,530 A * | 3/1990 | Bessho | ........................ 356/487 |
| 5,060,225 A | 10/1991 | Godfrey | |
| 5,139,336 A | 8/1992 | See et al. | |
| 5,212,825 A | 5/1993 | Layton | |
| 5,274,381 A | 12/1993 | Riza | |
| 5,305,084 A | 4/1994 | Doi et al. | |
| 5,402,230 A | 3/1995 | Tian et al. | |
| 5,412,474 A * | 5/1995 | Reasenberg et al. | ......... 356/486 |
| 5,450,195 A | 9/1995 | Dammann et al. | |
| 5,459,571 A | 10/1995 | Dammann et al. | |
| 5,493,395 A * | 2/1996 | Otsuka | ........................ 356/487 |
| 5,828,454 A | 10/1998 | Gust | |
| 6,646,723 B1 * | 11/2003 | Dubovitsky et al. | ......... 356/4.1 |

* cited by examiner

*Primary Examiner*—Samuel A. Turner
*Assistant Examiner*—Michael A. Lyons
(74) *Attorney, Agent, or Firm*—John H. Kusmiss

(57) ABSTRACT

The present invention relates to a heterodyne interferometer system with a pre-processing of the target signal to isolate and remove self-interference signals using a known phase modulation of the carrier signal's frequency. Where self-interference signals do not include a time delay inherent in the target signal that travels to the target reflector, by selecting a modulation frequency tuned to the time delay and then filtering the resultant signal the target beam can be isolated and the self-interference signal can be effectively removed The system includes a modulation unit to apply a phase modulation to the carrier signal, and a mixing unit that demodulates the target signal at the modulation frequency to isolate the target beam.

16 Claims, 2 Drawing Sheets

HETERODYNE INTERFEROMETER WITH A PHASE MODULATED SOURCE

ORIGIN OF THE INVENTION

The invention described herein was made in performance of work under a NASA contract, and is subject to the provisions of Public Law 96-517 (35 U.S.C. §202) in which the Contractor has elected not to retain title.

BACKGROUND OF THE INVENTION

Most practical interferometers used for precision sensing are based on a concept of heterodyne interferometer due to its high-precision readout afforded by the heterodyne signal processing. However, a typical optical heterodyne interferometer is limited in its resolution to a few nanometers by a parasitic leakage of optical signals called "polarization mixing," or more generally "self-interference", resulting in measurement non-linearity. The non-linearity is proportional to the ratio of the self-interference-induced heterodyne beat to the desired range-related interferometer signal, ordinarily on the order of several percent. A number of laboratory techniques have been proposed in the past to suppress the self-interference. All of these techniques are very difficult to implement with a precision required and their implementation often introduces its own noise into the interferometer. For example, cyclic averaging by reference position dithering or ramping of the frequency both degrade the inherent stability of the interferometer by destabilizing the reference arm or the carrier frequency, respectively.

Self-interference limits the resolution of a heterodyne interferometer by a parasitic leakage. It occurs, for example, when an optical signal that is designated to travel to the target instead travels along the reference path due to optics imperfections, misalignment, and scattering. It manifests itself as a heterodyne signal with an incorrect phase that then combines with the heterodyne signal of the correct phase, resulting in a cyclic nonlinearity in the interferometer's phase vs. displacement response. If the "good" signal is not attenuated by the optical losses, then the self-interference limits the typical interferometer resolution to about 1 nm. However, If the "good" signal is attenuated by the optical losses due to, for example, diffraction over long target distances, poor target reflectivity, or aperturing of the beam, then the parasitic signal with the wrong phase can actually dominate over the desired signal and render the interferometer inoperable.

SUMMARY OF THE INVENTION

The purpose of the present invention is to eliminate or minimize self-interference. The invention is a heterodyne interferometer system with carrier phase modulation. The invention provides a system that phase modulates a laser beam at a reference frequency $\Omega$ and divides the phase modulated beam into the "local" and "target" beams. The local and target beams are frequency shifted to by two respective frequency shifters with a difference frequency "f". A portion of the two beams are diverted to a reference photodetector using a standard arrangement of optics to form a reference heterodyne signal. The undiverted part of the target beam is directed toward the target whose displacement is being measured. The undiverted local beam does not go to the target and serves as an optical phase reference. The target and local beams are then mixed at a signal photodetector. The target and local beams travel unequal path lengths in reaching the signal photodetector, and therefore the pure phase modulation gets converted into intensity modulation at frequency $\Omega$. The electrical output of the signal photodetector is synchronously detected at frequency $\Omega$. The output of the synchronous detection filter contains a signal at heterodyne fequency f with an electronic phase equal to the optical phase difference between the local and target beams. This signal is then fed to the phase meter where it's phase is compared to the reference signal. The self-interference which results from local and target beams traveling nearly identical path lengths does not pick up intensity modulation at frequency $\Omega$ and therefore is attenuated by the synchronous detection filter.

The phase modulation frequency $\Omega$ is tuned for optimum performance depending on the distance to the target.

BRIEF DESCRIPTION OF THE DRAWING

The exact nature of this invention, as well as its objects and advantages, will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and s forth the best modes contemplated by the inventors of carrying out their invention. Various modifications, however, will remain readily apparent to those skilled in the art, since the general principles of the present invention have been defined herein specifically to provide an improved interferometer using intensity modulation to discriminate and isolate parasitic self-interference of the hetrodyne signal.

Figure 1:
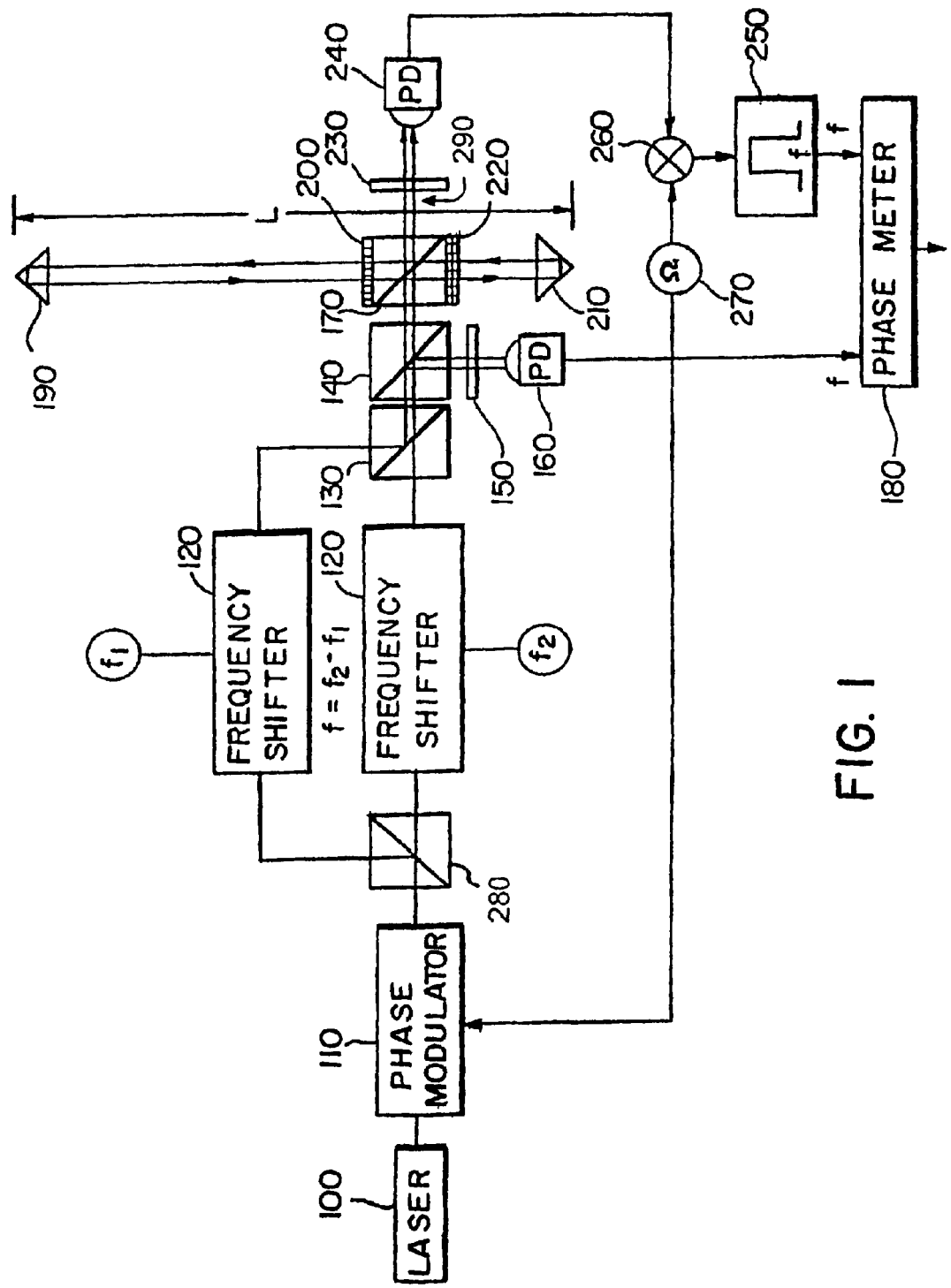
FIG. 1 is a schematic illustration of a preferred embodiment of the present invention.

The schematic of the invention is shown in FIG. 1. The light coming out of the laser source 100 is phase modulated using a phase modulator 110 (fiber-pigtailed integrated optic circuit in this implementation) which applies a sinusoidal carrier phase modulation to the light coming out of the laser source before it is split by beam splitter 280 between the two legs of the heterodyne interferometer. Each leg is subsequently frequency shifted by frequency shifters 120 to generate a convenient heterodyne frequency $f=(f_2-f_1)$, where the two beams are polarized orthogonal to each other. The output of each frequency shifter 120 is collimated and combined using a polarizing beam splitter (PBS) 130.

Small portions of the two beams are reflected by the non-polarizing beamsplitter (BS) 140, mixed by the polarizer 150, and the resulting heterodyne frequency beat is detected on the reference photodetector 160. This beam creates a reference phase that is evaluated at the phase meter 180, and will be used to evaluate the signal phase.

The portions of the p-polarized beam and the s-polarized beam pass through the beam splitter 140 and encounter the polarized beam splitter 170. The p-polarized light is transmitted and serves as an optical phase reference. The s-polarized light is reflected toward the target reflector 190 and is reflected back into the polarized beam splitter 170. The polarization of the returning light is rotated by 90 degrees, because it double-passed a quarter-wave plate 200 oriented at 45 degrees. The beam has been converted to a p-polarized beam by the passage through the quarter-wave plate, and therefore is transmitted by the polarized beam splitter 170 to the reference reflector 210 and returned to the polarized beam splitter 170 as s-polarized light, because it was again rotated by 90 degrees by the second quarter-wave plate 220. At this point, the s-polarized beam is recombined in an optical reference location 290 with the transmitted p-polarized optical reference beam. A polarizer 230 oriented at 45 degrees mixes the two orthogonally polarized beams and the interference beats are detected by the signal photodetector 240.

If the magnitude and frequency of the phase modulation are chosen appropriately for the target distance L, significant beats involving the phase modulation frequency ($\Omega$) are generated at the signal photodetector 240. The desired heterodyne signal can be recovered by demodulating at various harmonics of $\Omega$. In is the implementation shown in FIG. 1, the demodulation is performed at $\Omega$, which downconverts the $\Omega$−f and $\Omega$+f components into the beat at the heterodyne frequency.

The key feature of this signal processing is that the magnitude of the produced heterodyne signal is proportional to $\sin(\pi\Omega L_D/c)$, $$S \propto \sin(\pi\Omega L_D/c)$$

where c is the speed of light and $L_D$ is the total path length difference between the two arms of the interferometer and consists of the path length due to target separation (L) and the internal path length mismatch of the interferometer ($L_{INT}$);

$$L_D = L + L_{INT}$$

The above dependencies allow one to suppress the unwanted signals resulting from self-interference. The self-interference results from the non-ideal operation of the interferometer.

First, a portion of the s-polarized beam instead of being entirely reflected by the second polarized beam splitter 170 toward the target reflector 190 is transmitted directly into the signal photodetector 240. Similarly, a small portion of the beam traveling to the target reflector 190 may instead be scattered back by the polarized beam splitter 170 and quarter-wave polarizers 200,220. These beams would generate a self-interference beat with a wrong phase in the regular heterodyne interferometer, but in this implementation they are suppressed by the $\sin(\pi\Omega L_D/c)$ modulation. Because the s-polarized self-interference beam did not travel to the target, the path length difference between the two legs of the interferometer is only the internal path length difference, i.e., $L_D = L_{INT}$, which can be made to be very small. Assuming that the interferometer is optimized for operation with a target distance of L, i.e., $\sin(\pi\Omega L_D/c)$ is an appreciable number, the self-interference signal is suppressed by a factor of $L/L_{INT}$.

A second source of self-interference results from the s-polarized beam traveling to the target twice. This results from polarization optics and alignment imperfections. This source of self-interference is significant only for low-loss interferometers. In high-loss interferometers, it is greatly suppressed by the loss associated with an additional round trip to the target. The magnitude of the double-pass self-interference signal in the heterodyne interferometer with a phase modulated source is proportional to $\sin(2\pi\Omega L_D/c)$ and therefore can be suppressed by choosing $$\Omega = c/(2L_D) c/(2L)$$

In effect, phase modulation of the source marks the desired signal returning from the target with an intensity modulation at the frequency of phase modulation. For other signals the phase modulation of the carrier does not result in appreciable intensity modulation and they are suppressed by demodulation at the frequency of phase modulation.

The foregoing is a novel method of pre-processing the heterodyne signal to eliminate self-interference. The self-interference beat, because it results from the target beam not going to the target, does not experience the differential delay and does not generate an intensity modulated signal. Conversely, the target beam, having traveled to the target and experienced the differential delay does generate intensity modulation. The target beam and the local beam are both directed to an optical reference location 290 where the target beam and the local beam are recombined before reaching the signal photodetector 240. The intensity modulation is used to discriminate and isolate the signal coming back from the target from the parasitic self-interference beat resulting from leakage and scatter. The signal coming back from the target is also called a target signal or a true signal. The output of the signal photodetector 240 is mixed with the phase-modulation frequency $\Omega$ from the local oscillator 270 at mixer 260, shifting the desired signal down to the heterodyne frequency f and upshifting the self-interference beat into $\Omega$−f and $\Omega$+f. Electronic passband filter 250 at f is used to block the self-interference-induced signals. An important feature of this method is that after down conversion the outputs of the system are identical to that of an ordinary heterodyne interferometer and therefore all previously developed signal processing methods can be employed.

The performance characteristics of the present invention can be evaluated by how well it suppresses self-interference. The synchronous detection, consisting of the mixer 260 and an electronic bandpass filter 250, blocks the zero-order self-interference beat; however self-interference and potentially other stray reflections of the target beam create small, but finite, components at the same frequency as the desired signal. These residual components pass through the electronic passband filter unattenuated and contaminate the input to the phase meter 180. The constituent components of the heterodyne beat at the input to the phase meter are given by the following equation $$V_s = \sum_k H(L_k, \Omega, \varphi_{RF}) \sin\left[2\pi\left(ft + (v_0 + f_1)\frac{L_k}{c}\right)\right] \quad (1)$$

where $$H(L_k, \Omega, \varphi_{RF}) = \sin\left[\varphi_{RF} + 2\pi\Omega\frac{L_k}{c}\right] J_1\left\{2\Delta\phi\sin\left(2\pi\Omega\frac{L_k}{c}\right)\right\} \quad (2)$$

$L_k$ is the optical pathlength differences between target and local beams responsible for a given heterodyne beat, e.g. $L_{SI}$~0 and $L_T$=L;

$\phi_{RF}$ is an RF phase difference between the two inputs to the mixer;

c is the speed of light;

$\Delta\phi$ is the magnitude of the carrier phase modulation;

$\Omega$ is the frequency of phase modulation;

$v_o$ is the optical carrier frequency, and $f = f_1 - f_2$ is the heterodyne frequency.

In the above equation the magnitude of each heterodyne beat component is given by the function $H(L_k, \Omega, \phi_{RF})$. It can be thought of as a pathlength filter function. Its characteristics are set by phase modulation parameters: frequency ($\Omega$) and RF phase shift between the local oscillator 270 and the imposed intensity modulation ($\phi_{RF}$). Its amplitude depends on the optical pathlength difference between the target and local beams responsible for the corresponding heterodyne beat.

Figure 2:
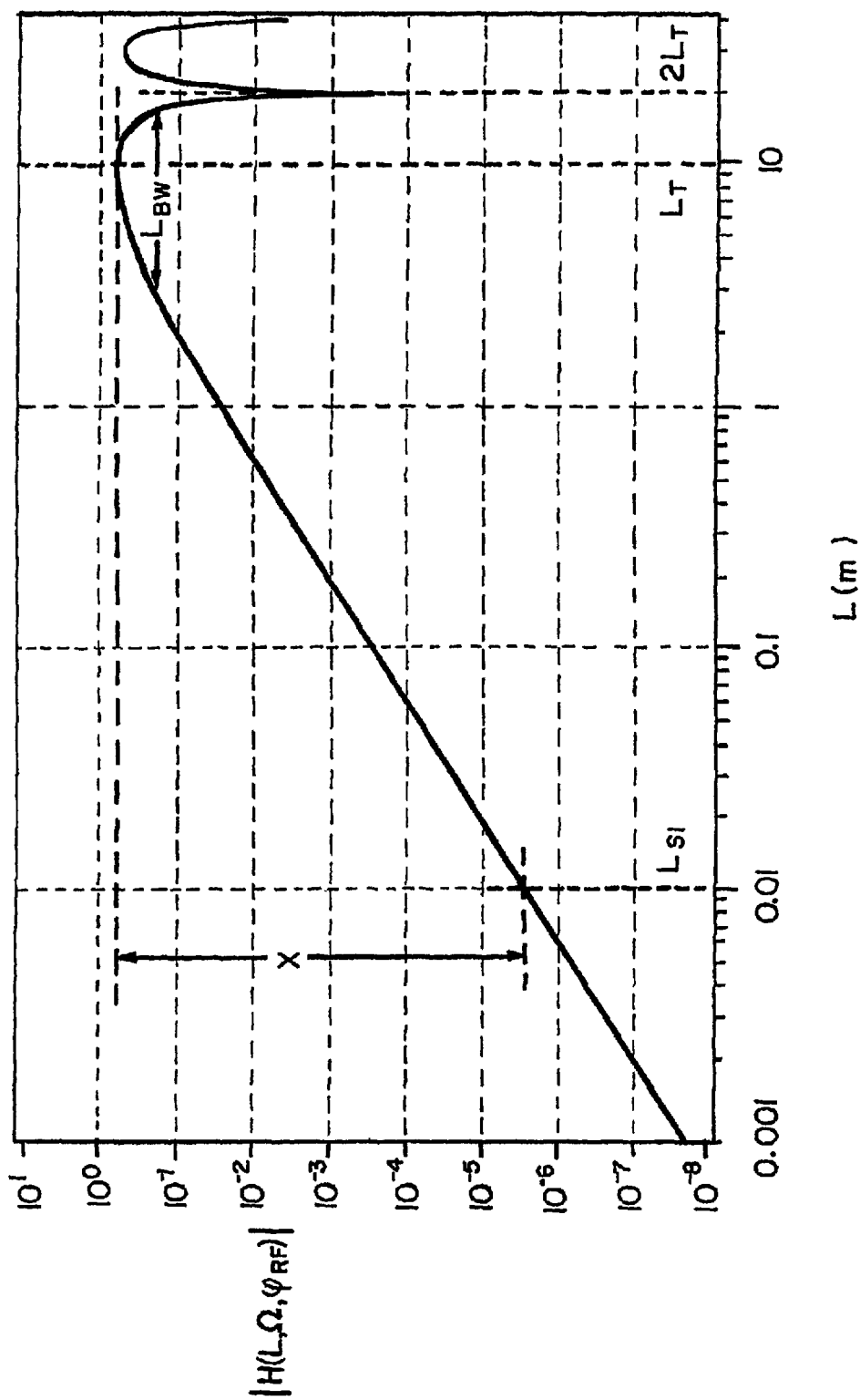
FIG. 2 is a graph of an illustrative filter function optimized for ten meters to illustrate the suppression of self-interference.

FIG. 2 shows the filter function, H, versus the optical pathlength difference between the target and local beams. The filter function as shown in FIG. 2 is optimized for a target distance of 10 meters by setting the phase modulation frequency $\Omega$=7.5 MHz. The heterodyne beat due to the target beam returning from the target retroreflector 10 meters away will have $L_T$=10 m and therefore its amplitude, relative to that without phase modulation, will be given by $H_T$=H(10 m, 7.5 MHz, 0)=0.58, assuming that the internal reference photodetector lengths have been matched so that $\phi_{RF}$=0 and the amplitude of the carrier phase modulation is $\Delta\phi$=1.84 to maximize the first harmonic. The self-interference beat, on the other hand, results from the target beam going straight through the polarized beam splitter along with the local beam and therefore will have $L_{SI}$~0, yielding:

$$H_{SI}=H(L_{SI}, 75 \text{ MHz}, 0) \sim 0.$$

The value of $L_{SI}$ is set by the internal pathlength mismatch between the target and the local aims of the interferometer, and is mainly determined by how closely the fibers in the two arms can be matched in length. The factor by which the phase modulation filter function will suppress the voltage amplitude of the self-interference beat relative to the desired signal is given by equation (3), assuming that $L_T \gg L_{SI}$.

$$X = \frac{H(L_T, \Omega, \varphi_{RF})}{H(L_{SI}, \Omega, \varphi_{RF})} \cong \left(\frac{L_T}{L_{SI}}\right)^2 \quad (3)$$

If the fiber lengths can be matched to 1 cm, signal interference can be suppressed by a factor of ~$10^6$.

Laboratory tests have achieved a 40 dB suppression of the self-interference beat to achieve nanometer-level resolution despite a presence of the self-interference beat greater than the desired range-related heterodyne signal. In an interferometer without such high optical loss this method can be used to achieve sub-nanometer resolution.

Those skilled in the art will appreciate that various adaptations and modifications of the just-described preferred embodiment can be configured without departing from the scope and spirit of the invention Therefore, it is to be understood that, within the scope of the appended clams, the invention may be practiced other than as specifically described herein.

What is claimed is:

1. A heterodyne interferometer system with carrier phase modulaution comprising:
   a laser light source;
   a phase modulator positioned to receive a beam from the laser light source and apply a sinusoidal carrier phase modulation;
   a frequency shifter for shifting the frequency of a target beam and a local beam emanating from the phase modulator, the difference between she target beam frequency and the local beam frequency designated as the heterodyne frequency f,
   a reference photodetector;
   a signal photodetector;
   a beam splitter for deflecting a portion of the target beam and local beam to the reference photodetector and directing another portion of the target beam and local beam to a polarizing beam splitter;
   a polarizing beam splitter for directing the local beam directly to the signal photodetector, and for directing the target beam to a pair of reflectors separated in distance by L, the reflected target beam being returned by the separated reflectors to the polarizing beam splitter, the reflected target beam being directed to the signal photodetector;
   a signal mixer for mixing the phase-modulation frequency with the output of the signal photodetector to shift the target signal to the heterodyne frequency f and shift a self-interference signal into sidebands about the modulation frequency;
   a bandpass filter at the heteodyne frequency f to isolate the target signal and exclude the self-interference signal; and
   a phase meter to receive signals from the reference photodetector and compare the phase with a phase of the target signal filtered by the bandpass filter.

2. The heterodyne interferometer system of claim 1 wherein the phase modulation frequency is selected to optimize the target signal having traveled the distance L.

3. The heterodyne interferometer systemn of claim 1 wherein the target beam and the local beam are polarized in orthogonal planes.

4. The heterodyne interferometer system of claim 1 wherein the target beam is synchronously demodulated at the phase modulation frequency.

5. The heterodyne interferometer system of claim 1 wherein the self-interference signal is suppressed by a factor of $L/L_{INT}$.

6. The heterodyne interferometer system of claim 1 further comprising a second frequency shifter.

7. A heterodyne interferometer comprising:
   a light source for providing a carrier signal;
   a phase modulator for modulating the carrier signal, wherein the phase modulator applies a modulation at a modulation frequency to the carrier signal to produce a phase modulated carrier signal;
   a target path for directing a first portion or the phase modulated carrier signal to a target;
   a reference path for directing a second portion of the phase modulated carrier signal to an optical reference location; and
   a comparator for comparing the first portion of the phase modulated carrier signal with the second portion of the phase modulated carrier signal to determine a distance between the target and a fixed point.

8. The heterodyne interferometer of claim 7 wherein the first portion of the phase modulated carrier signal is demodulator at the modulation frequency after being directed to the target.

9. The hetrodyne interferometer of claim 8 further comprising a frequency shifter for shifting the frequency of the phase modulated carrier signal prior to the directing of the first and second portions of the phase modulated carrier signal to the target and optical reference location, respectively.

10. A method for distinguishing a target signal in a heterodyne interferometer with a parasitic interference signal comprising the steps if:
   providing a signal source to deliver a carrier signal;
   applying a modulation to the carrier signal, where said modulation is selected from one of phase modulation and frequency modulation;
   directing a first portion of the modulated carrier signal to a path that includes a target and ends at an optical reference location;

directing a second portion of the modulated carrier signal to the optical reference location, the first portion and the second portion generating an interference intensity modulation including a parasitic self-interference;

demodulating the first portion of the modulated carrier signal at a frequency selected based upon the modulation of the carrier signal; and evaluating the interference intensity modulation to discriminate between the parasitic self-interference and the portion of the modulated carrier signal that has traveled to the target.

11. The method of claim 10 further comprising the step of shifting the frequency of the carrier signal prior to directing the first and second portions of the modulated carrier signal.

12. A method for filtering a self-interference signal in a heterodyne interferometer from a true signal based on a phase difference between the self-interference signal and the true signal comprising the steps of:

providing a carrier signal;

phase modulating the carrier signal at a modulation frequency $\Omega$;

directing a first portion of the modulated carrier signal to a target and providing for a return of the first portion of the modulated carrier signal from the target to an optical reference location, the first portion of tube modulated carrier signal having traveled traveled to and from the target being designated as a true signal;

directing a second portion of the modulated carrier signal to tho optical reference location, the second portion of the modulated carrier signal being designated as a self-interference signal;

providing a photodetector for receiving both the true signal and the self-interference signal, the photodetector being located adjacent to the optical reference location;

demodulating the output of tube photodetector at the modulation frequency $\Omega$ to isolate the self-interference signal front the true signal; and filtering the self-interference signal from the true signal based on the isolation of the previous step.

13. A hetrodyne interferometer system with carrier phase modulation comprising:

a laser light source for emanating a beam of laser light;

a phase modulator positioned to receive the beam from the laser light source and apply a sinusoidal carrier phase modulation having a phase modulation frequency $\Omega$ to the beam, the phase modulator emanating a target beam and a local beam;

a first frequency shifter for shifting the frequency of the target beam based on a first frequency f1;

a second frequency shifter for shifting the frequency of the local beam based on a second frequency f2, wherein the difference between the shifted target beam frequency and the shifted local beam frequency is a heterodyne frequency f, a reference photodetector for producing an output indicating a reference phase;

a signal photodetector for producing an output indicating a signal phase, the signal photodetector output including a target signal and a self-interference signal;

a beam splitter for deflecting a portion of the target beam and local beam to the reference photodetector and directing another portion of the target beam and local beam to a polarizing beam splitter;

a polarizing beam splitter for transmitting the local beam directly to the signal photodetector and for deflecting the target beam to a target reflector, the target reflector returning light toward the polarizing beam splitter;

a first quarter-wave plate disposed between the polarizing beam splitter and the target reflector, the first quarter-wave plate being oriented to rotate the polarization of the returning light from the target reflector by 90 degrees, wherein the returning light from the target reflector is transmitted through the polarizing beam splitter toward a reference reflector, the reference reflector returning light toward the polarizing beam splitter;

a second quarter-wave plate disposed between the polarizing beam splitter and the reference reflector, the second quarter-wave plate being oriented to rotate the polarization of the returning light from the reference reflector by 90 degrees, wherein the target reflector and the reference reflector are separated by a distance L, the reflected light from the reference reflector being deflected by the polarizing beam splitter to the signal photodetector;

a signal mixer for mixing the phase-modulation frequency $\Omega$ with the output of the signal photodetector to shift the target signal to the heterodyne frequency f and shift the self-interference signal into sidebands about the phase modulation frequency;

a bandpass filter at the hetrodyne frequency f to isolate the target signal and exclude the self-interference signal, the bandpass filter producing an output including the isolated target signal; and a phase meter to receive the output from the reference photodetector and the output from the bandpass filter and compare the reference phase with the target signal phase, the comparison of the reference phase with the target signal phase producing an output indicating the measurement of the distance L.

14. The heterodyne interferometer system with carrier phase modulation of claim 13, wherein the phase-modulation frequency $\Omega$ is 7.5 MHz.

15. The heterodyne interferometer system with carrier phase modulation of claim 13, wherein the reference phase is detected by a heterodyne frequency beat.

16. The heterodyne interferometer system with carrier phase modulation of claim 13, wherein the signal phase is detected by a heterodyne frequency beat.

* * * * *